June 29, 1965     R. L. JAMES     3,192,462
SCR FED MOTOR CONTROL SYSTEM
Filed Jan. 22, 1962
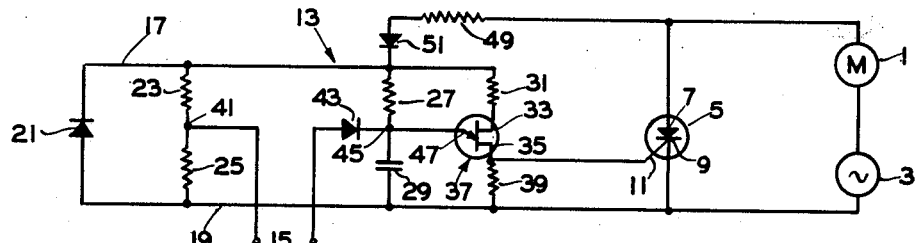
FIG. 1
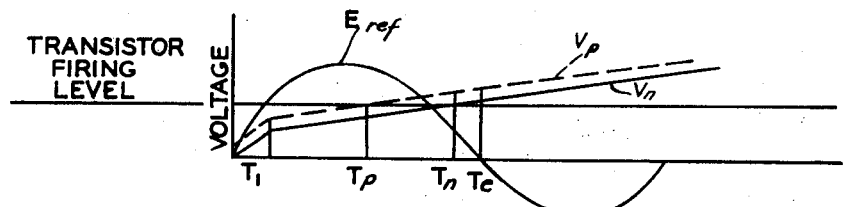
FIG. 2
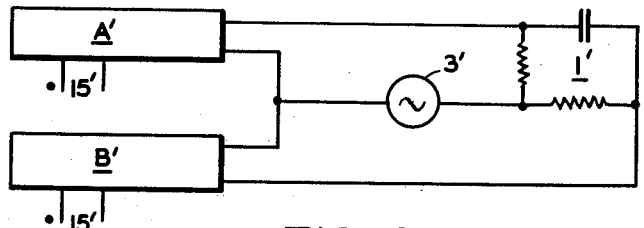
FIG. 3
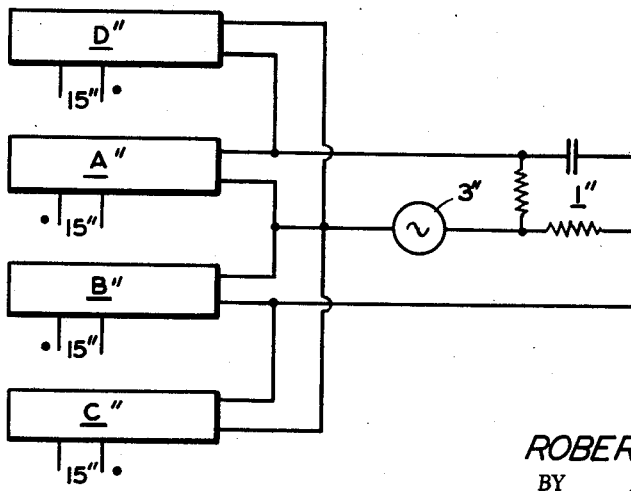
FIG. 4
INVENTOR.
ROBERT L. JAMES
BY
ATTORNEY United States Patent Office 3,192,462
Patented June 29, 1965

3,192,462
SCR FED MOTOR CONTROL SYSTEM
Robert L. James, Bloomfield, N.J., assignor to The Bendix Corporation, Teterboro, N.J., a corporation of Delaware
Filed Jan. 22, 1962, Ser. No. 167,760
7 Claims. (Cl. 318—345)

This invention relates to control systems and more particularly to control systems adapted for operating electric servo motors.

One object of the invention is to provide a control circuit which produces pulses in response to a signal and in which the time of occurrence of the pulses corresponds to the amplitude of the signal.

Another object of the invention is to provide means for phase shifting a gating pulse as a direct function of a variation in a signal to gate a controlled rectifier for proportionally controlling an electric motor.

Another object of the invention is to provide a controlled rectifier circuit for controlling an electric motor wherein the motor is pulsed for a period in each half cycle of controlled rectifier anode positive voltage in accordance with the amplitude of a signal.

Another object of the invention is to provide a controlled rectifier circuit for providing a proportional output and which has few active elements, is simple in design, and economical to manufacture and has a unique yet simple means for sampling a control signal.

The invention contemplates a circuit for providing a proportional output, which may be used for controlling the operation of an electric motor, from a power source in accordance with a signal, comprising a controlled rectifier connected to the source, and a pulse forming circuit connected to the controlled rectifier for providing pulses for rendering the controlled rectifier conducting and provide a proportional output in accordance with the signal.

The foregoing and other objects and advantages of the invention will appear more fully hereinafter from a consideration of the detailed description which follows, taken together with the accompanying drawing wherein three embodiments of the invention are illustrated by way of example. It is to be expressly understood, however, that the drawing is for illustration purposes only and is not to be construed as defining the limits of the invention.

In the drawing:

FIGURE 1 is a schematic wiring diagram of an electric servo motor control circuit constructed according to the present invention, FIGURE 2 is a voltage versus time graph showing the manner in which the basic control circuit of FIGURE 1 operates, FIGURE 3 is a block diagram showing two basic control circuits of FIGURE 1 connected to provide half-wave reversible servo motor control, and, FIGURE 4 is a block diagram showing four basic control circuits of FIGURE 1 connected to provide full-wave reversible servo motor control.

Referring to the drawing and more particularly to FIGURE 1, shown therein is a novel control circuit constructed according to the present invention and adapted particularly for proportionally controlling operation of an electric alternating or direct current motor 1 by alternating power source 3 in response to a signal. A silicon controlled rectifier 5 is connected in series with source 3 and motor 1 and controls energization of motor 1 from source 3. Silicon controlled rectifier 5 operates similarly to a thyratron and passes current from anode 7 to cathode 9 after a gating pulse is applied to gating terminal 11 and while the anode supply voltage is positive. The gating pulses for silicon controlled rectifier 5 are provided by a novel pulse forming circuit 13 and the time of occurrence of the pulses in each half cycle of positive anode supply voltage corresponds to the amplitude of a control signal applied to input 15.

Pulse forming circuit 13 comprises a pair of parallel leads 17, 19, connecting in parallel a zener diode 21, a pair of series connected pedestal resistors 23, 25, series connected rider resistor 27 and capacitor 29, and series connected resistor 31, bases 33 and 35 of unijunction transistor 37 and resistor 39. An alternating current or direct current signal for controlling motor 1 is applied to pulse forming circuit 13 at input 15 connected to a point 41 between resistors 23 and 25 and through a diode 43 to a point 45 between resistor 27 and capacitor 29. Emitter 47 of unijunction transistor 37 is connected to point 45. The parallel circuits between leads 17 and 19 are connected in series with a voltage dropping resistor 49 and a diode 51 and this arrangement is connected in parallel with silicon controlled rectifier 5 to motor 1 and alternating power source 3.

The parallel circuits between parallel leads 17, 19, of pulse forming circuit 13 are energized by alternating power source 3 through motor 1, voltage dropping resistor 49 and diode 51. Diode 51 passes only alternate half cycles of the reference voltage so that a pulsating half-wave voltage appears at lead 17. Zener diode 21 is non-conducting below its threshold potential so that the pulsating voltage rises almost instantaneously to a predetermined level corresponding to the threshold potential of zener diode 21. Diode 21 thereupon conducts and maintains the voltage at the predetermined level substantially to the end of the half cycle.

Bases 33 and 35 of unijunction transistor 37 are biased so that as the voltage at lead 17 rises positively emitter 47 to base 33 path opens. Resistors 23 and 25 are relatively small, resistor 27 is large and capacitor 29 is small. Consequently, the time constant of resistors 23, 25, and capacitor 29 is relatively short compared to the time constant of resistor 27 and capacitor 29.

Upon a positive rise in voltage at lead 17, a charge rapidly builds up on capacitor 29 during time $T_1$, as shown by solid line $V_n$ in FIGURE 2 from pedestal resistors 23 and 25 through input 15 and diode 43 and more slowly during time $T_n$ through rider resistor 27. Diode 43 conducts until it is reverse biased at time $T_1$. The values of voltage at lead 17 and the values of pedestal resistors 23, 25, are selected so that the voltage across capacitor 29 builds up rapidly to a value just under the firing level of transistor 37 at time $T_1$ and the value of rider resistor 27 is selected so that capacitor 29 will be charged to transistor firing level at time $T_n$ just before the end $T_e$ of the half cycle of controlled rectifier anode voltage in the absence of a signal at input 15.

When capacitor 29 is charged by the rider voltage to the firing level of unijunction transistor 37 the resistance of emitter 47 to base 35 path of transistor 37 becomes low and capacitor 29 discharges rapidly through that path to gating terminal 11 of controlled rectifier 5. Controlled rectifier 5 receives a gating pulse at time $T_n$ substantially at the end $T_e$ of its positive half cycle of anode voltage and pulses electric motor 1 during the time interval between $T_n$ and $T_e$. In the absence of a signal at input 15, motor 1 is maintained at standby condition and does not rotate.

When a positive signal is applied to input 15 the signal is added to the pedestal voltage from pedestal resistors 23, 25 during initial charging of capacitor 29, and at time $T_1$ capacitor 29 is charged to an amount which is the sum of the pedestal voltage and signal as shown by the dotted line $V_p$. Capacitor 29 continues to be charged more slowly through resistor 27 until capacitor 29 is charged to transistor firing level at time $T_p$. Capacitor 29 then discharges through transistor 37 and a gating pulse is applied to gating terminal 11 of controlled rectifier 5 at time $T_p$ and controlled rectifier 5 pulses motor 1 during the time interval $T_p$ to $T_e$ of its half cycle of positive anode voltage.

Controlled rectifier 5 receives a gating pulse phase shifted with respect to time in the positive half cycle of anode voltage which is a function of the amplitude of the signal at input 15. Thus, the period in each half cycle in which electric motor 1 is pulsed is determined by the amplitude of the signal. A small increase in the amplitude of the signal effects a substantial advance in the firing time of transistor 37 as shown in FIGURE 2 so that motor 1 is energized during a proportionate period during each half cycle.

The circuit described thus far controls operation of motor 1 in one direction only in response to a positive direct current signal or an alternating signal in phase quadrature with the reference source.

In FIGURE 3 there is shown a proportional alternating current motor control system constructed according to the invention and using two basic circuits A', B' of FIGURE 1 and providing for reversible control of an alternating current motor 1' in response to reversal in phase of an alternating current signal. Circuits A' and B' are connected to alternating current source 3' so that the pulse forming circuits of circuits A' and B' are energized in phase opposition by source 3' and the signals are applied to inputs 15' of the circuits in the same phase or polarity sense. Source 3' is connected to motor 1', shown as a two phase motor, so that when circuit A' conducts, motor 1' is driven in one direction and when circuit B' conducts, motor 1' is driven in the opposite direction. Circuits A' and B' provide a half-wave reversible output for controlling motor 1'.

In FIGURE 4 is shown a full-wave reversible proportional motor drive using four basic circuits A", B", C" and D". Circuits A" and C" are energized by source 3" in the same phase and in phase opposition to circuits B" and D". The signals are applied to input 15" of circuits A" and B" in the same phase or polarity and oppositely in phase or polarity to the signals applied to inputs 15" of circuits C" and D". Source 3" is connected to motor 1" so that when circuits A" and D" conduct, motor 1" is driven in one direction and when circuits B" and C" conduct motor 1" is driven in the opposite direction. With this arrangement motor 1" is energized by a full wave phase reversible output from circuits A", B", C" and D". Suitable isolation of the signals at the inputs 15' and 15" of the circuits of FIGURES 3 and 4 must be used.

The control circuit described herein produces pulses in response to a signal and the time of occurrence of the pulses corresponds to the amplitude of the signal and the pulses may be used for proportionally controlling an electric motor in accordance with the amplitude of the signal.

While three embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

While the invention has been described in connection with alternating current, two-phase motors or other type motors may be used instead, including direct current motors by suitably connecting the motors to the outputs of the circuits in a well known manner.

What is claimed is:

1. A circuit for proportionally controlling the operation of an electric motor from a power source in accordance with a signal, comprising a controlled rectifier connected to the motor and source and having a gating terminal, a pulse forming circuit including a unijunction transistor connected to the gating terminal, a capacitor connected to the unijunction transistor and adapted to discharge through the unijunction transistor for providing pulses, and pedestal means for rapidly charging the capacitor and rider means for slowly charging the capacitor in accordance with the signal in each half cycle of positive anode supply voltage of the controlled rectifier so that the capacitor discharges through the unijunction transistor for providing pulses to the controlled rectifier at a time in each said half cycle corresponding to the amplitude of the signal for rendering the controlled rectified conducting during the remainder of the half cycle to energize the motor in accordance with the signal.

2. A circuit for proportionately controlling the operation of a device from a power source in accordance with a signal, comprising a controlled rectifier connected to the device and source and having a gating terminal, a pulse forming circuit including a unijunction transistor connected to the gating terminal, a capacitor connected to the unijunction transistor and adapted to discharge through the unijunction transistor for providing pulses, pedestal means for rapidly charging the capacitor and rider means for slowly charging the capacitor, and means for applying the signal to the pulse forming circuit to charge the capacitor in accordance with the signal in each half cycle of positive anode supply voltage of the controlled rectifier so that the capacitor discharges through the unijunction transistor and provides pulses to the controlled rectifier at a time in each said half cycle corresponding to the amplitude of the signal for rendering the controlled rectifier conducting during the remainder of the half cycle to energize the device in accordance with the signal.

3. A circuit for proportionately controlling the operation of a device from a power source in accordance with a signal, comprising a controlled rectifier connected to the device and source and having a gating terminal, a pulse forming circuit including a unijunction transistor connected to the gating terminal, a timing circuit including a resistor and a capacitor connected to the unijunction transistor, and means for applying the signal to the pulse forming circuit without changing the time constant of the timing circuit for charging the capacitor in each half cycle of positive anode supply voltage of the controlled rectifier in accordance with the signal so that the capacitor discharges through the unijunction transistor and provides pulses to the controlled rectifier at a time in each said half cycle corresponding to the amplitude of the signal for rendering the controlled rectifier conducting during the remainder of the half cycle to energize the device in accordance with the signal.

4. A circuit for proportionately controlling the operation of a device from a power source in accordance with a signal, comprising a controlled rectifier connected to the device and source and having a gating terminal, a pulse forming circuit including a unijunction transistor connected to the gating terminal, a pair of timing circuits including a capacitor connected to the unijunction transistor and having different time constants, and means for applying the signal to the pulse forming circuit without changing the time constants of the timing circuits for charging the capacitor in each half cycle of positive anode supply voltage of the controlled rectifier in accordance with the signal so that the capacitor discharges through the unijunction transistor and provides pulses to the controlled rectifier at a time in each said half cycle corresponding to the amplitude of the signal for rendering the controlled rectifier conducting during the remainder of the half cycle to energize the device in accordance with the signal.

5. A circuit for forming pulses at a time in each half cycle of a positive reference voltage corresponding to the amplitude of a signal, comprising a unijunction transistor, a capacitor connected to the unijunction transistor and adapted to discharge through the unijunction transistor, pedestal means for rapidly charging the capacitor and rider means for slowly charging the capacitor, and means for applying the signal to the pulse forming circuit to charge the capacitor in accordance with the signal in each half cycle of positive reference voltage so that the capacitor discharges through the unijunction transistor and provides pulses at a time in each said half cycle corresponding to the amplitude of the signal.

6. A circuit for forming pulses at a time in each half cycle of a positive reference voltage corresponding to the amplitude of a signal, comprising a unijunction transistor, a capacitor connected to the unijunction transistor and adapted to discharge through the unijunction transistor, a timing circuit including a resistor and a capacitor connected to the unijunction transistor, and means for applying the signal to the pulse forming circuit without changing the time constant of the timing circuit to charge the capacitor in accordance with the signal in each half cycle of positive reference voltage so that the capacitor discharges through the unijunction transistor and provides pulses at a time in each said half cycle corresponding to the amplitude of the signal.

7. A circuit for forming pulses at a time in each half cycle of a positive reference voltage corresponding to the amplitude of a signal, comprising a unijunction transistor, a capacitor connected to the unijunction transistor and adapted to discharge through the unijunction transistor, a pair of timing circuits including a capacitor connected to the unijunction transistor and having different time constants, and means for applying the signal to the pulse forming circuit without changing the time constants of the timing circuits to charge the capacitor in accordance with the signal in each half cycle of positive reference voltage so that the capacitor discharges through the unijunction transistor and provides pulses at a time in each said half cycle corresponding to the amplitude of the signal.

References Cited by the Examiner

Publication: GESCR Manual, 2d Edition, Auburn, New York, 1961. TK 2798 G4g., pages 60, 61, 115, 116.

ORIS L. RADER, *Primary Examiner.*

MILTON O. HIRSHFIELD, *Examiner.*